(12) United States Patent
Lazovsky et al.

(10) Patent No.: US 8,692,916 B2
(45) Date of Patent: Apr. 8, 2014

(54) CONTINUOUS CLOCKING MODE FOR TDI BINNING OPERATION OF CCD IMAGE SENSOR

(75) Inventors: Leonid Lazovsky, Waterloo (CA); Andrey Lomako, Waterloo (CA); Brian Benwell, Waterloo (CA)

(73) Assignee: Teledyne Dalsa, Inc., Waterloo (CA)

( * ) Notice: Subject to any disclaimer, the term of this patent is extended or adjusted under 35 U.S.C. 154(b) by 239 days.

(21) Appl. No.: 13/404,328

(22) Filed: Feb. 24, 2012

(65) Prior Publication Data

US 2013/0057739 A1 Mar. 7, 2013

Related U.S. Application Data

(60) Provisional application No. 61/446,286, filed on Feb. 24, 2011.

(51) Int. Cl.
*H04N 5/232* (2006.01)
(52) U.S. Cl.
USPC ............ 348/297; 348/296

(58) Field of Classification Search
USPC .............. 348/294–299; 250/208.1
See application file for complete search history.

(56) References Cited

U.S. PATENT DOCUMENTS

| | | | | |
|---|---|---|---|---|
| 5,231,502 A * | 7/1993 | Pfister | ............ | 348/250 |
| 6,831,688 B2 * | 12/2004 | Lareau et al. | ............ | 348/272 |
| 6,856,350 B2 * | 2/2005 | Orava et al. | ............ | 348/308 |

* cited by examiner

*Primary Examiner* — Tuan Ho
(74) *Attorney, Agent, or Firm* — Aaron Edgar; Gowling Lafleur Henderson LLP

(57) ABSTRACT

A device and method for continuous vertical clocking a charge-coupled device image sensor operating in a time delay and integration and binning mode of operation is disclosed. The method includes providing a charge-coupled device image sensor with a continuous charge transfer signal to a vertical charge-coupled device register for shifting charge continuously to more closely approximate the speed of movement of the target object of capture by the image sensor in order to eliminate artifacts in the TDI imaging direction. The control module of the CCD image sensor provides the continuous charge transfer signal to the vertical charge-coupled device register.

7 Claims, 6 Drawing Sheets

US 8,692,916 B2

CONTINUOUS CLOCKING MODE FOR TDI BINNING OPERATION OF CCD IMAGE SENSOR

FIELD

The present disclosure relates generally to charge-couple device (CCD) image sensors and devices. More particularly, the disclosure relates to the operation of CCD image sensors operating in a time delay integration mode with binning.

INTRODUCTION

Charge-coupled devices (CCD) are semiconductor devices that can be used for imaging. A typical CCD image sensor consists of an array of photosensitive charge-coupled elements or pixels. Each charge-coupled element accumulates an electric charge proportional to the intensity of the incident radiation on the element. After the array has been exposed, the CCD is operated as a shift register to move the charge out of the CCD array where the electric charge is then converted to a voltage and digitized.

In applications with low light levels or fast moving objects, a time delay and integration (TDI) CCD sensor can be used. TDI is a method of scanning objects that are moving relative to the CCD sensor. In a TDI CCD sensor, the exposure (integration) and shifting operations are carried out together so that the moving charge is aligned with the same part of the object. In this way, the image signal can be integrated for much longer over the length of the CCD providing increased sensitivity by a factor roughly equal to the number of pixels along the CCD sensor in the movement direction.

Binning is another mode of operation that can be used to increase sensitivity and speed of the CCD sensor. By combining electric charge from adjacent pixels before sending them to the output amplifier the binning mode can improve the signal-to-noise ratio and increase the frame rate, but at the expense of reduced spatial resolution of the CCD sensor.

In TDI imaging the object movement is inherently continuous but the charge transfer is inherently discrete. This results in artifacts associated with mapping the analog movement of the object onto a discrete set of elements of the CCD array in a TDI imaging mode. Artifacts that are associated with the discrete movement of the charge in the CCD image sensor during TDI operation are inherent to the TDI modality and can not be completely eliminated. This results in reduced ability of CCD image sensor in TDI mode to resolve high spatial frequencies in the scanning direction. These artifacts become even larger and more profound if an additional increase of sensitivity is achieved by binning the CCD image sensor array in the direction of the charge movement. TDI operation with binning results in significant mismatch between shifting the charge packets within the CCD image sensor and the continuous speed of mechanical scanning.

SUMMARY

According to a first aspect, a charge-coupled device image sensor is provided operating in a time delay and integration mode with vertical binning for capturing an object having a rate of movement relative to the image sensor, the device comprising a vertical charge-coupled device register for collecting a plurality of charge packets corresponding to incident radiation from the object; a control module for providing a continuous charge transfer signal to the vertical charge-coupled device register to propagate the plurality of charge packets to correspond to the rate of movement of the object. In some aspects the continuous clock signal has a constant rate. In a related aspect the image sensor has a transfer gate for accumulating charge packets corresponding to a vertically binned pixel.

According to a second aspect, a method is provided for reading a charge-coupled device image sensor operating in a time delay and integration mode with vertical binning for capturing an object having a rate of movement relative to the image sensor, the method comprising providing a continuous charge transfer signal to a vertical charge-coupled device, the vertical charge-coupled device register for collecting a plurality of charge packets corresponding to incident radiation from the object, the continuous charge transfer signal to propagate the plurality of charge packets to correspond to the rate of movement of the object. In some aspects the continuous clock signal has a constant rate.

DRAWINGS

For a better understanding of the various embodiments described herein and to show more clearly how they may be carried into effect, reference will now be made, by way of example only, to the accompanying drawings which show at least one exemplary embodiment, and in which.

Figure 4:
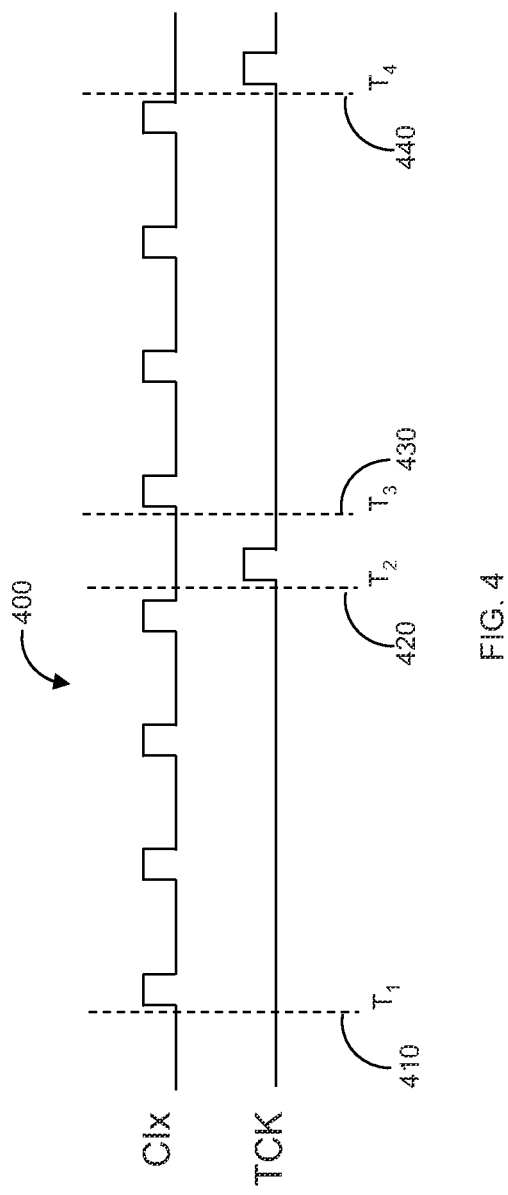
FIG. 4 is a timing diagram illustrating a continuous clocking technique for transferring charge packets in a binned TDI CCD image sensor.
Figure 6:
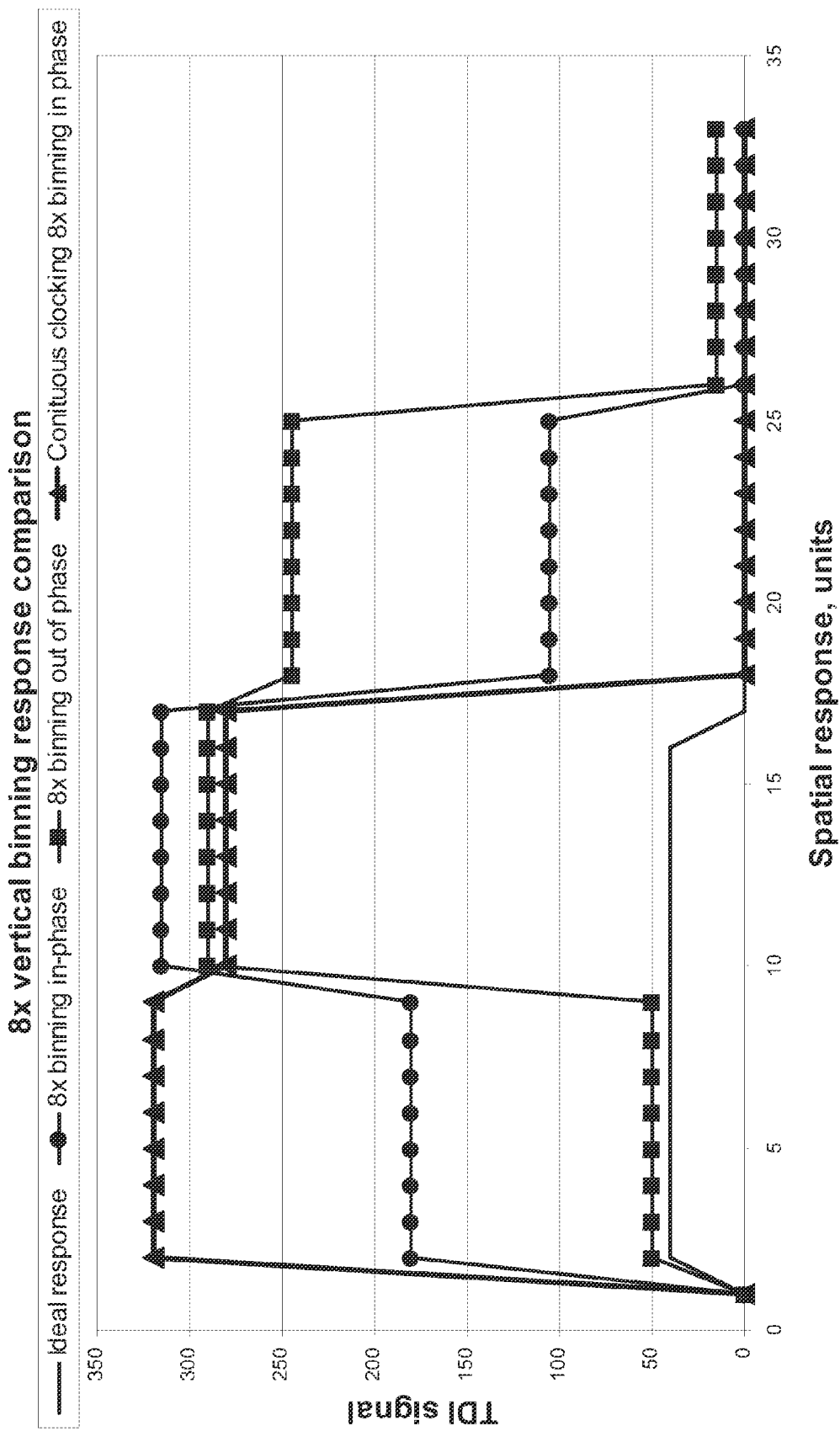
Figure 7:
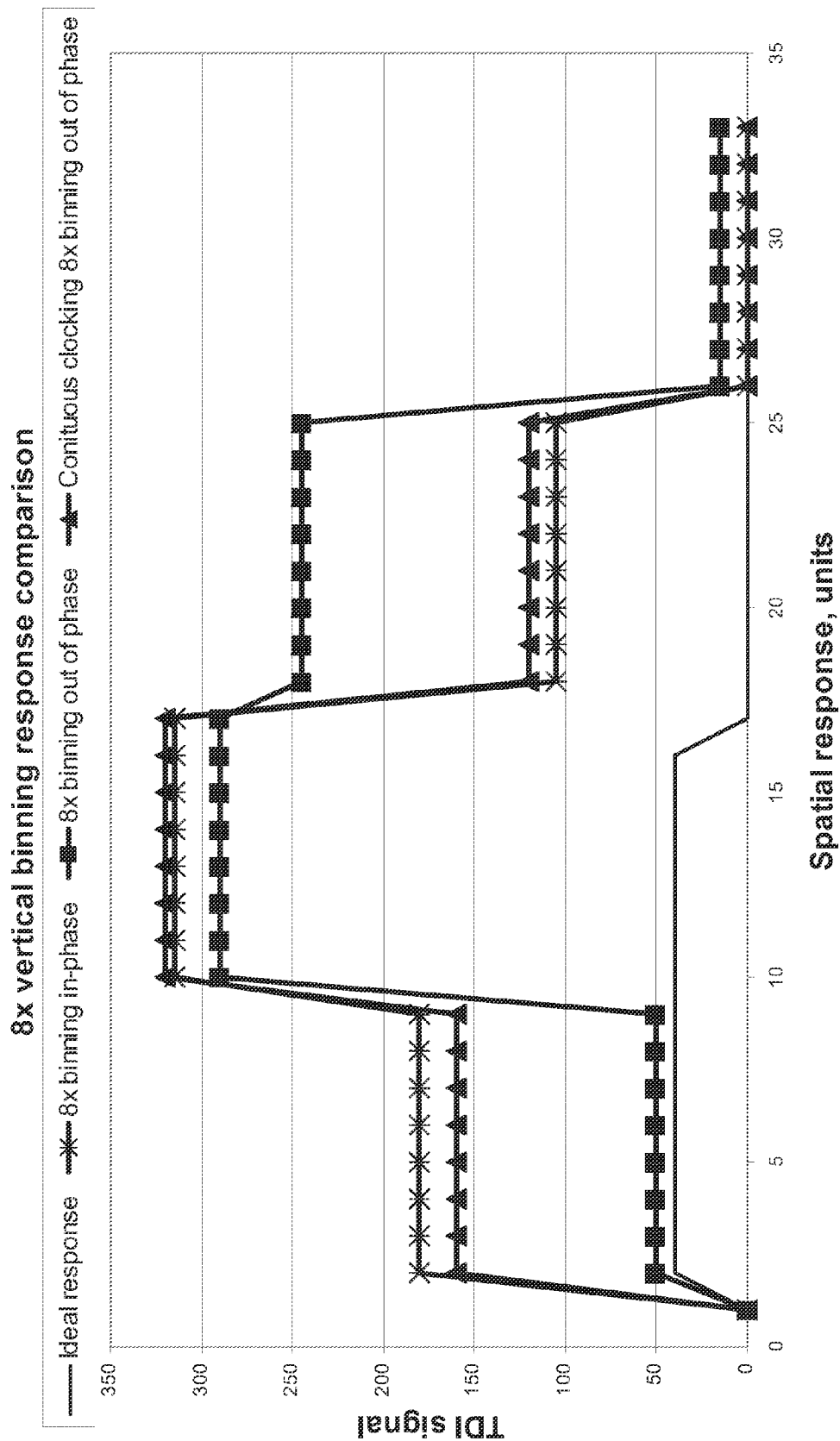

FIG. 6 is a graph of simulation results illustrating the effects of transferring charge packets in-phase in a 8× vertically binned TDI CCD image sensor using the continuous clocking technique of FIG. 4; and FIG. 7 is a graph of simulation results illustrating the effects of transferring charge packets out-of-phase in a 8× vertically binned TDI CCD image sensor using the continuous clocking technique of FIG. 4.

DESCRIPTION OF VARIOUS EMBODIMENTS

It will be appreciated that for simplicity and clarity of illustration, where considered appropriate, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementations of various embodiments.

Figure 1:
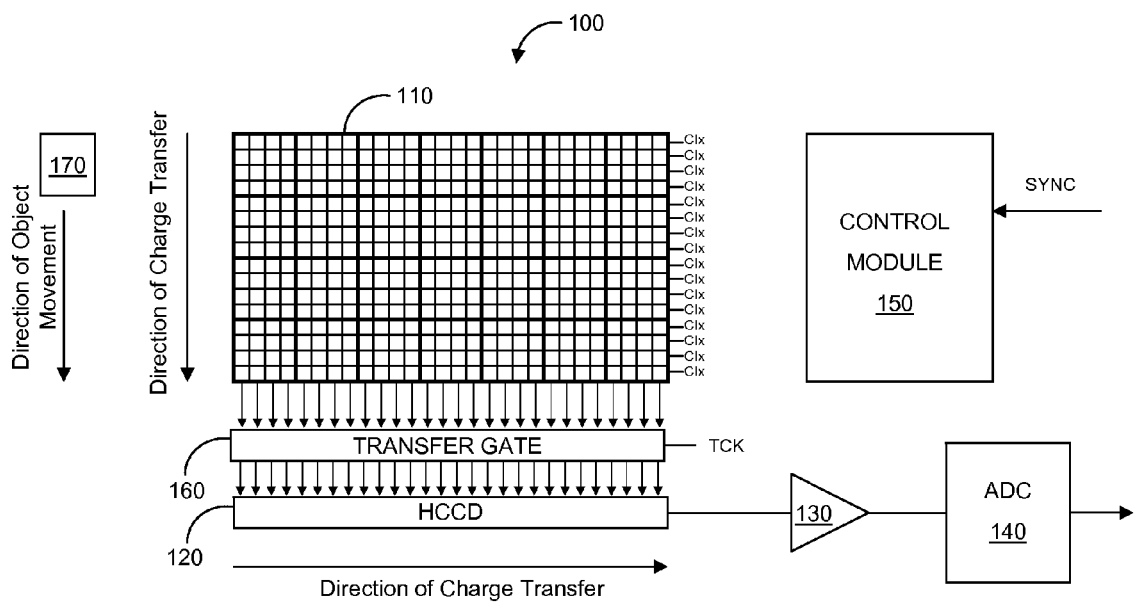
FIG. 1 is a block diagram of a CCD image sensor illustrating time delay and integration and binning.

Reference is first made to FIG. 1, shown is a block diagram of an embodiment of a CCD image sensor 100 for illustrating time delay and integration technology and binning. CCD image sensor 100 consists of array 110 of photosensitive charge-coupled elements or pixels. Array 110 is provided as a 16×28 pixel array for example purposes but other array sizes can be used as is known in the art. Each pixel of array 110 converts the incident radiation into an electric charge or charge packet stored by the pixel that is proportional to the intensity of the incident radiation. Radiation can be visible light, infrared, X-rays or other known types of radiation that can be detected by pixels of array 110.

Array 110 is composed of a number of parallel photosensitive CCD registers that are oriented in the vertical direction in FIG. 1, and are referred to as vertical CCD registers (VCCD). To prevent the lateral spread of charge, each VCCD is isolated from adjoining VCCD registers. In traditional array CCD applications, the charge is accumulated in the charge-coupled elements during the exposure period and the charge is clocked out of the array 110 during the readout period. During the readout period the charge packets are first transferred vertically and then horizontally a single row of array 110 at a time to readout all pixels. A single charge packet from each VCCD is transferred to horizontal CCD or HCCD 120, that then shifts the charge packets horizontally towards amplifier 130. Amplifier 130 converts the charge packets to a voltage that is then digitized by analog-to-digital converter 140.

Each of the VCCD registers are controlled by clock signals, illustrated as signals Clx, that propagate the charge packets towards HCCD 120. Although the clock signals are shown as one signal for each row of array 110, typical CCD architectures employ multiphase clocking techniques to propagate the charge packets while keeping the charges packets isolated from each other as is known in the art. HCCD 120 is similarly driven by clock signals to propagate the charge packets towards amplifier 130. Control module 150 is responsible for synchronizing the clock signals between the VCCD of array 110 and HCCD 120 in order to readout sensor array 110.

Array 110 can be operated in a time delay and integration mode (TDI) by clocking the VCCD registers to ensure that the charge packets are transferred at the same rate and same direction as the image. TDI increases exposure time (integration) time by moving the image along with the charge. For example, object 170 can be moved relative to array 110 to ensure that the signal charge building up in the CCD remains aligned under the same part of image. This allows the image to be integrated for a longer period of time, thus increasing the sensitivity by a factor roughly equal to the number of stages in the vertical direction (i.e. 16 times for array 110).

In the TDI mode of operation, the image on CCD array 110 is collected and readout at the same time, one row of pixels from each of the VCCD at a time. As a row is read out, the charges in the remaining rows are shifted down by one row, causing the image to translate down the array 110 with the movement of object 170. TDI CCD technology can be used for applications with relatively fast movement between CCD image sensor 100 and object 170 being captured. Since the integration time is increased, TDI can also be used for applications with lower light or radiation levels. Further improvements to sensitivity and speed can be achieved by combining the TDI operation with binning the CCD array 110.

Binning is the process of combining charge from adjacent pixels in a CCD during readout which effectively increase the pixel size while also increasing sensitivity. Binning is a tradeoff between improved signal-to-noise ratio (SNR) and increased frame rate at the expense of a lower resolution. CCD read noise is added during each readout event from amplifier 130 and in normal operation, read noise will be added to each pixel. However, in binning mode the read noise is added to each super-pixel which has the combined charge from multiple pixels. In the ideal case, this produces a SNR improvement equal to the binning factor (i.e. the number of binned pixels).

The SNR advantage of binning a CCD sensor is unique to the CCD architecture. In a CMOS image sensor, for example, each individual pixel is amplified such that binning the CMOS pixels will combine the noise from each pixel, and thus not improve the SNR in contrast with the CCD binning technique.

Combining TDI and binning technology provides a CCD sensor with greater sensitivity and lower susceptibility to internal noise. In medical imaging this can allow for a much lower radiation dose for the patient in the imaging process and a faster imaging time.

If CCD image sensor 100 is operated in binning mode, additional registers can be used to accumulate the charge packets of the binned pixels. Array 110 is illustrated as having pixels binned into 4×4 groups or super-pixels as indicated by thicker lines in FIG. 1. Binning can be implemented in either horizontal, vertical or both directions. For the purposes of the improved clocking mode described herein we are primarily concerned with binning in the direction of the object movement in a TDI application. In order to accumulate charge from the VCCD, transfer gate 160 acts as a charge accumulation register to sum the charges from the VCCD registers before passing the charge packets into HCCD 120. Transfer gate 160 is a non-photosensitive register that has sufficient capacity to accumulate multiple charge packets from a VCCD without saturation. Using the 4×4 binning example illustrated in FIG. 1, transfer gate 160 will accumulate 4 charge packets from each VCCD and transfer the charge to HCCD 120 upon the transfer clock signal, shown as TCK, that is driven by control module 150. Control module 150 can control the vertical size of the binning through control of the TCK signal. Charge packets can be binned in the horizontal direction by using a single summing register (not shown) prior to amplifier 130. Using the 4×4 binning example, the summing register would accumulate 4 charge packets from the HCCD (where each of these charge packets are composed of 4 charge packets from the VCCD) that would then be transferred to amplifier 130 under control of control module 150.

Control module 150 provides the timing signals to shift the VCCD, HCCD 120 and transfer gate 160. Control module 150 can also reset array 110 and the various registers to remove any charge so that image sensor 100 is in a state to begin imaging. A SYNC signal can be provided to control module 150 to assist synchronizing the TDI charge transfer with the speed of object 170. Control module 150 can also be programmatically configured to set the TDI speed or the binning factor to be used.

The CCD image sensor illustrated in FIG. 1 is a simplified example to illustrate the TDI and binning concepts. Other variants of this CCD architecture that are known in the art may also be used. For example, it is possible to position an HCCD at either top or bottom of array 110 to allow both directions of charge/object movement charge. Other variants could partition the HCCD into sub-registers with each sub-register having its own output amplifier and summing register to increase the readout speed of the HCCD.

Figure 2:
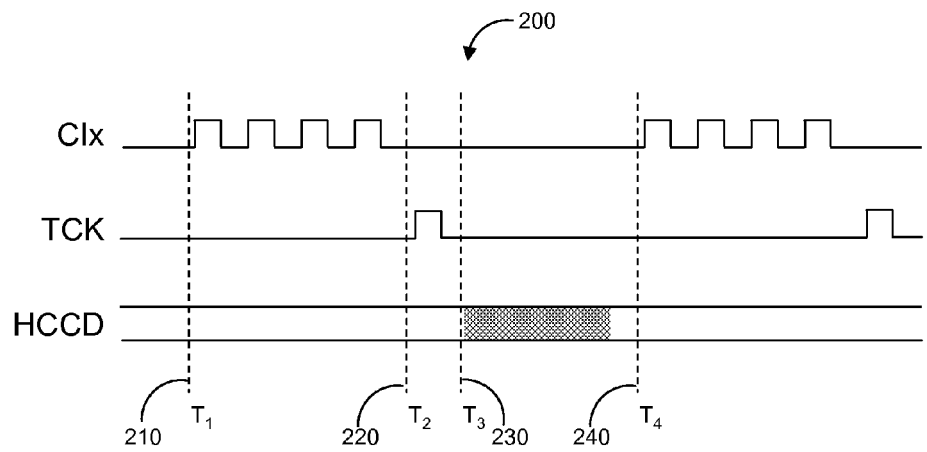
FIG. 2 is a timing diagram illustrating prior art approaches to transferring charge packets in a binned TDI CCD image sensor.

Referring now to FIG. 2, a timing diagram 200 is shown illustrating prior art clocking technique for transferring charge packets in a binned TDI image sensor. Timing diagram 200 shows that the VCCD register is clocked, beginning at time $T_1$ 210, using the Clx signals to propagate the charge towards transfer gate 160 to accumulate the charge from four pixels from each VCCD register. Next at time $T_2$ 220 the TCK signal is used to transfer the accumulated binned charges from an accumulation register, such as transfer gate 160, to HCCD 120. Once the charge is accumulated in HCCD 120, HCCD 120 is clocked at time $T_3$ 230 to propagate the charge towards amplifier 130. The period indicated by hashed lines after $T_3$ 230 is when the charge is being converted by amplifier 130 during which VCCD charge movement is stopped to eliminate transient noise effects that can affect amplifier 130. The process is then repeated to clock out the next four charge packets from the VCCD registers beginning at time $T_4$ 240.

Clocking the VCCD registers in the manner shown in FIG. 2 when operating CCD image sensor 100 in TDI mode of operation with binning results in a mismatch between the change in position of the charge packets in the VCCD with the continuous speed of object 170. This mismatch between the continuous speed of object 170 and the discrete charge transfer from the VCCD registers can result in artifacts in the scanning direction of the resultant image. The mismatch also manifests in a reduced ability of CCD image sensor 100 in TDI mode to resolve high spatial frequencies in the scanning direction, or a reduced modulation transfer function of CCD image sensor 100. As the binning factor in the scanning direction is increased, the effect of the artifacts and reduced modulation transfer function have an increased impact on the resultant image. An increased binning factor basically increases the time of the discrete charge transfer that results in a larger mismatch with the continuous speed of the object.

Figure 3:
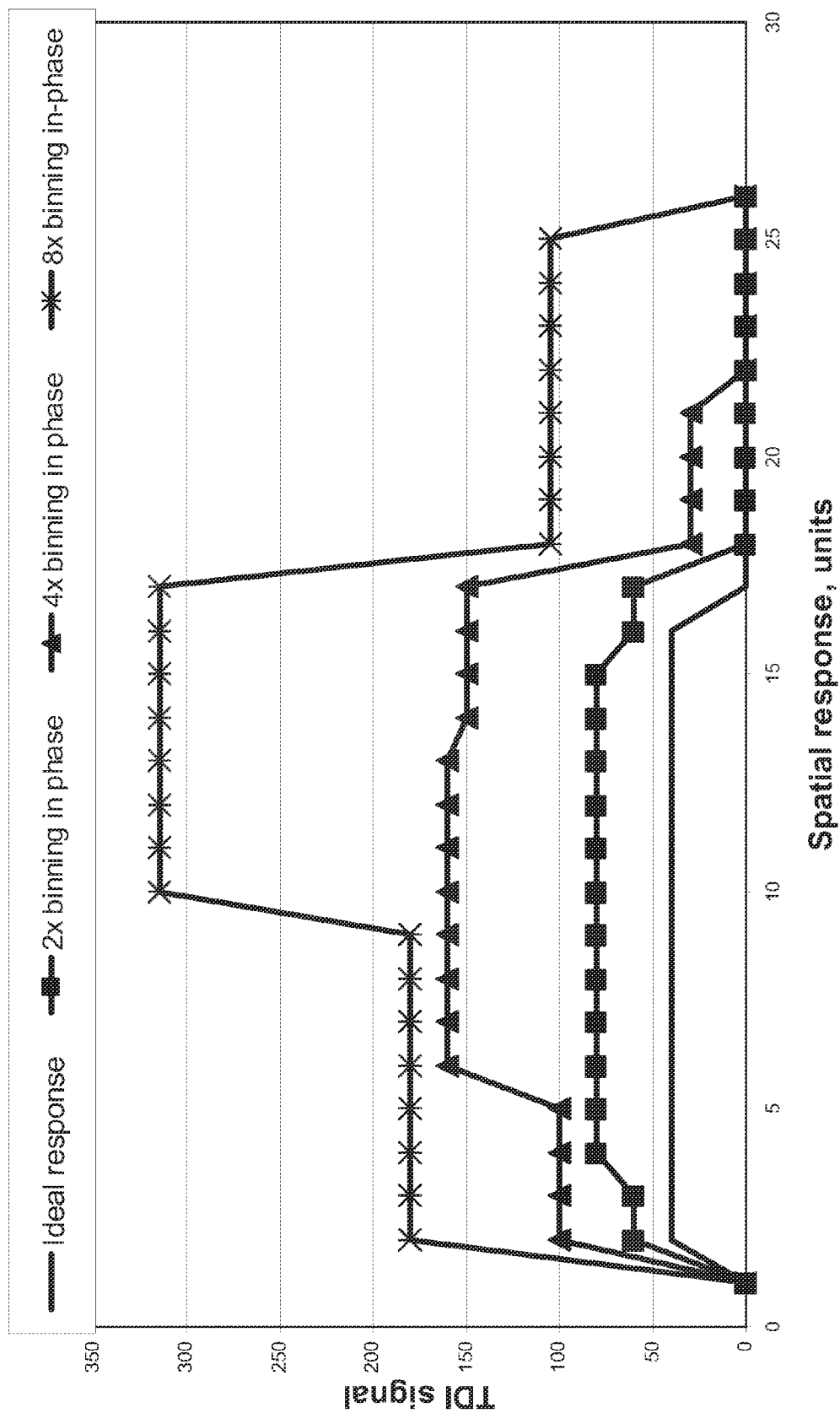
FIG. 3 is a graph of simulation results illustrating the response signal of transferring charge packets in a binned TDI CCD image sensor using the clocking technique shown in FIG. 2.

Referring now to FIG. 3, graph 300 of simulation results is shown illustrating the response signal of transferring charge packets in a binned TDI image sensor using clocking technique shown in FIG. 2. Graph 300 illustrates an ideal response compared with the artifacts and reduced resolution using vertical binning modes of 2×, 4×, and 8×.

The simulation environment involves capturing an object that is 15 spatial units long that is being imaged by a TDI image sensor that is 40 spatial units long (i.e. a single VCCD register). When the object is above a pixel of the sensor it generates a signal equal to '1', otherwise the pixel has no signal. An ideal charge transfer function and charge transfer efficiency are used for the simulation. The TDI line rate is perfectly synchronized to the mechanical motion of the object.

The ideal response shows the 15 spatial unit long object having a TDI signal quantum of 40 units corresponding to the integration over the TDI image sensor that is 40 spatial units long. Clocking the image sensor using binning in the manner illustrated in FIG. 2 causes distortion of the output signal as a result of the spatial and temporal convolution of the analog movement of the object. Distortion in the binning examples appears in the shape of the transition area for 'bright-to-dark' and 'dark-to-bright' edges. The output signal with binning shows the object to be longer than the actual 15 spatial units with the distortion and length of the output signal increasing with the binning factor. This lengthening artifact may be referred to as a 'tail' in the signal. This tail artifact is increased with the degree of binning used as can be seen by comparing the length of the output signal between 2×, 4× and 8× binning output signals shown in graph 300.

The simulation results shown in FIG. 3 are performed using in-phase transitions where the object crosses the boundary of the binned pixel exactly after the vertical transfer. Out-of-phase transitions were also simulated where the object crosses the boundary of the binned pixel exactly in between the vertical transfers. The out-of-phase response signals are described in more detail with respect to FIGS. 5-7.

Referring now to FIG. 4, timing diagram 400 is shown illustrating a continuous clocking technique for transferring charge packets in a binned TDI image sensor. Timing diagram 400 shows that the VCCD register is clocked continuously with the Clx charge propagation signal. The continuous clocking would be used to readout the entire VCCD although only two binned pixels each containing four charge packets are shown in the example in FIG. 4. The term 'continuous' is used to indicate that the Clx signal that propagates charge packets within the VCCD register is applied without interruption or an intervening period of time in contrast to the Clx signal applied in FIG. 2 noting the period between $T_3$ 230 and $T_4$ 240.

In the architecture of CCD image sensor 100 illustrated in FIG. 1 shifting the charge in the VCCD cannot be performed while amplifying the charge from HCCD 120 without introducing noise and other artifacts. Thus, in order to propagate and amplify the charge from HCCD 120, CCD image sensor 100 must stop clocking the VCCD registers during HCCD read out period beginning at time $T_3$ 230 in FIG. 2. The architecture of CCD image sensor 100 may be altered to allow for the continuous clocking technique shown in FIG. 4.

In some embodiments the continuous clocking signal may also be used at a constant rate to readout the entire VCCD register. The continuous and constant rate clock signal should approximate the rate of movement of object 170.

Referring back to FIG. 4, beginning at time $T_1$ 410, the Clx signals propagate the charge towards transfer gate 160 to accumulate charge from four pixels from each VCCD register prior to the TCK signal at time $T_2$ 420 to transfer the accumulated binned charge. Next, at time $T_3$ 430, the next binned pixel is clocked from the VCCD register into transfer gate 160 during which the Clx signal maintains a constant clock rate. At time $T_4$ 440, the binned charge is transferred from transfer gate 160 and the process is repeated, maintaining a continuous Clx signal to transfer the remaining charge in array 110.

The continuous clocking approach in FIG. 4 can be contrasted with the traditional clocking technique for reading a TDI CCD image sensor in binning mode shown in FIG. 2. In the traditional clocking technique in FIG. 2 the Clx signal is clocked at a higher clock rate between $T_1$ 210 and $T_2$ 220 but then stops during the readout of HCCD 120 between time $T_3$ 230 and $T_4$ 240. In the traditional clocking technique the average clock rate of the Clx signals approximates the rate of movement of object 170, but stopping charge transfer in the VCCD register results in artifacts in the resultant image in the direction of the object movement. By continuously clocking the VCCD register using a constant signal these artifacts can be reduced. In FIG. 4 the Clx signals clock the VCCD register at a constant rate that corresponds to the rate of movement of object 170 relative to CCD image sensor 100 to effectively move the charge within the VCCD register along with object 170.

Figure 5:
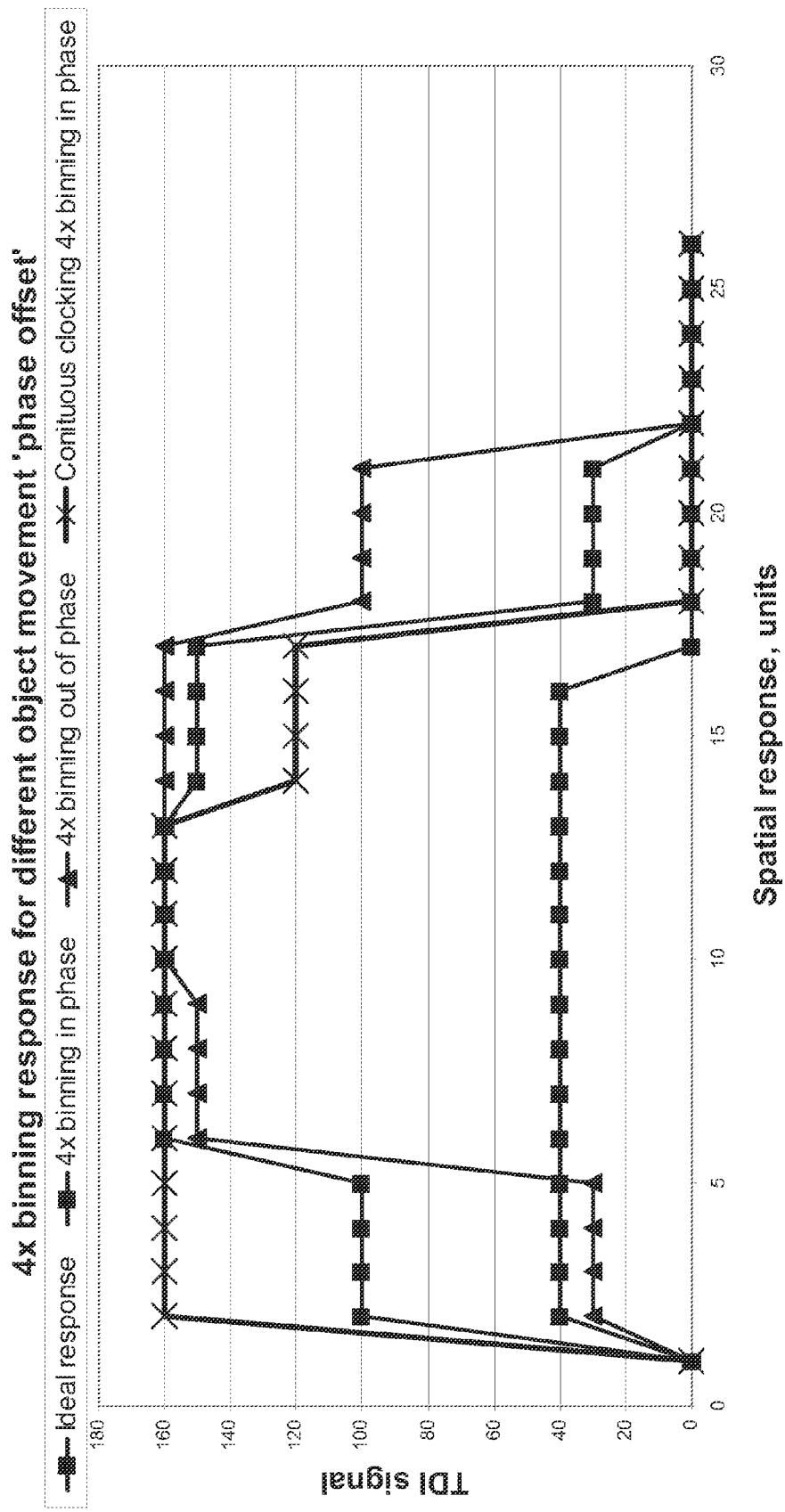
FIG. 5 is a graph of simulation results illustrating the effects of transferring charge packets in a 4× vertically binned TDI CCD image sensor using the continuous clocking technique of FIG. 4.

Referring now to FIG. 5, a graph 500 is shown of simulation results illustrating the effects of transferring the charge packets in a 4× vertically binned TDI image sensor using continuous clocking. Graph 500 illustrates an ideal non-binned response, 4× binning responses (both in-phase and out-of-phase), and the response for continuously clocking the image sensor in-phase. The 4× binning responses illustrate the response signal using the clocking technique shown in FIG. 2. The simulation environment is the same as that described with respect to FIG. 3. As illustrated by graph 500, the response of continuously clocking the image sensor, such as by using the clocking technique of FIG. 4, reduces the tail or lengthening artifact in the output signal. Reduction of the lengthening artifact could result in noticeable improvements in spatial response from continuously clocking the TDI image sensor in binning mode.

Next, referring to FIG. 6, a graph 600 is shown of simulation results illustrating the effects of transferring the charge packets in a 8× vertically binned TDI image sensor using continuous clocking. Graph 600 illustrates an ideal non-binned response, 8× binning responses (both in-phase and out-of-phase), and the response for continuously clocking the image sensor in-phase. Again, the simulation environment is the same as that described with respect to FIG. 3. The 8× binning responses illustrate the response signal using the clocking technique shown in FIG. 2. Comparing the 4× binning response of FIG. 5 with the 8× binning response shows that the larger binning factor increases the tail or length of the artifacts in the simulation. As illustrated by graph 600, the response of continuously clocking the image sensor, such as by using the clocking technique of FIG. 4, reduces the tail or lengthening artifacts in the output signal.

Referring now to FIG. 7, a graph 700 is shown of simulation results illustrating the effects of transferring the charge packets in a 8× vertically binned TDI image sensor using continuous clocking out-of-phase. The out-of-phase 8× binning with continuous clocking illustrates the worst-case scenario where the boundary of the 8× binned pixel occurs in the middle of the object. Graph 700 illustrates an ideal non-binned response, 8× binning responses (both in-phase and out-of-phase), and the response for continuously clocking the image sensor out-of-phase. Once again the same simulation environment as described with respect to FIG. 3 is used. The 8× binning responses illustrate the response signal using the clocking technique shown in FIG. 2.

As illustrated by graph 700, the response of continuously clocking the image sensor, such as by using the clocking technique of FIG. 4, produces a response that approximates the in-phase regular 8× binning mode response. Comparing FIGS. 6 and 7 shows that continuous clocking in the best case (i.e. in-phase as shown in FIG. 6) produces almost no artifact or 'tail' in the signal whereas the worst case (i.e. out-of-phase as shown in FIG. 7) approximates regular binning mode at its best performance (i.e. regular binning mode in-phase). Also, using 8× binning mode with the traditional clocking technique the response signal does not reach its maximum (i.e. 8 bins of 40 units of TDI signal=320 TDI signal), whereas with the continuous clocking approaches shown in FIGS. 6 and 7 the TDI signal reaches 320 TDI signal units with continuous clocking. The simulation results show that continuously clocking the binned TDI image sensor produces an output signal with reduced artifacts and increased signal strength over the traditional mode of clocking a binned TDI CCD image sensor.

The charge transfer function in TDI imaging with binning is dependent on the phase of object movement with respect to the TDI binned charge transfer. The simulation results illustrate that TDI operation with binning inherently has an impact on the charge transfer function at spatial frequencies close to the Nyquist frequency. This is illustrated in FIGS. 6 and 7 using 8× binning to capture an object that is 15 spatial units long. Continuously clocking the TDI image sensor in binning mode provides an increased spatial response from the TDI image sensor and improves the charge transfer function at frequencies close to the Nyquist frequency.

While the exemplary embodiments have been described herein, it is to be understood that the invention is not limited to the disclosed embodiments. The invention is intended to cover various modifications and equivalent arrangements included within the spirit and scope of the appended claims, and scope of the claims is to be accorded an interpretation that encompasses all such modifications and equivalent structures and functions.

The invention claimed is:

1. A charge-coupled device image sensor operating in a time delay and integration mode with vertical binning for capturing an object having a rate of movement relative to the image sensor, the device comprising:
   a vertical charge-coupled device register for collecting a plurality of charge packets corresponding to incident radiation from the object;
   a control module for providing a continuous charge transfer signal to the vertical charge-coupled device register to propagate the plurality of charge packets to correspond to the rate of movement of the object.

2. The charge-coupled device image sensor of claim 1 further comprising:
   a transfer gate for accumulating charge packets corresponding to a vertically binned pixel.

3. The charge-coupled device image sensor of claim 1 further comprising a plurality of vertical charge-coupled device registers wherein the continuous clock signal is applied to the plurality of vertical charge-coupled device registers.

4. The charge-coupled device image sensor of claim 1 wherein the continuous clock signal has a constant rate.

5. The charge-coupled device image sensor of claim 1 further comprising a horizontal charge-coupled device register and wherein the control module provides a clock signal to the horizontal charge-coupled device register to provide horizontal binning.

6. A method of reading a charge-coupled device image sensor operating in a time delay and integration mode with vertical binning for capturing an object having a rate of movement relative to the image sensor, the method comprising:
   providing a continuous charge transfer signal to a vertical charge-coupled device register, the vertical charge-coupled device register for collecting a plurality of charge packets corresponding to incident radiation from the object, the continuous charge transfer signal to propagate the plurality of charge packets to correspond to the rate of movement of the object.

7. The method of claim 6, wherein the continuous clock signal has a constant rate.

* * * * *